(12) United States Patent
Huang et al.

(10) Patent No.: US 10,373,769 B2
(45) Date of Patent: Aug. 6, 2019

(54) KEYBOARD STRUCTURE

(71) Applicant: DARFON ELECTRONICS CORP., Taoyuan (TW)

(72) Inventors: Jui-Yi Huang, Taoyuan (TW); Chien-Shih Hsu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 15/801,291

(22) Filed: Nov. 1, 2017

(65) Prior Publication Data

US 2018/0130614 A1   May 10, 2018

(30) Foreign Application Priority Data

Nov. 4, 2016   (TW) .............................. 105136028 A

(51) Int. Cl.
*H01H 3/12* (2006.01)
*B41J 5/12* (2006.01)
*G06F 1/16* (2006.01)

(52) U.S. Cl.
CPC ................ *H01H 3/122* (2013.01); *B41J 5/12* (2013.01); *G06F 1/1662* (2013.01)

(58) Field of Classification Search
CPC ........... H01H 3/122; G06F 1/1662; B41J 5/12
USPC ........................................ 200/341, 344, 345
See application file for complete search history.

(56) References Cited

U.S. PATENT DOCUMENTS

| 5,172,990 | A | | 12/1992 | Weng | |
| 5,173,578 | A | * | 12/1992 | Tama | H01H 13/705 |
| | | | | | 200/250 |
| 5,914,468 | A | * | 6/1999 | Nishimura | H01H 13/705 |
| | | | | | 200/344 |
| 8,319,127 | B2 | | 11/2012 | Yoshida | |
| 2013/0334021 | A1 | | 12/2013 | Lan | |
| 2016/0111231 | A1 | * | 4/2016 | Choi | H01H 13/14 |
| | | | | | 200/344 |

FOREIGN PATENT DOCUMENTS

| CN | 101604588 A | 12/2009 |
| CN | 201765989 U | 3/2011 |
| CN | 202258910 U | 5/2012 |
| CN | 104505291 A | 4/2015 |
| TW | 201039367 A1 | 11/2010 |
| TW | M472882 U | 2/2014 |

* cited by examiner

*Primary Examiner* — Edwin A. Leon
*Assistant Examiner* — Lheiren Mae A Caroc
(74) *Attorney, Agent, or Firm* — Winston Hsu

(57) ABSTRACT

A keyboard structure and assembling method thereof are provided. The keyboard structure includes a baseplate, a keycap and a frame having a hook body. The keycap can be inserted into the frame and restricted by the hook body, so that the range of movement of the keycap is restricted. The keycap cannot be separated from the frame so that the coupling of the frame and the baseplate is not interfered by the keycap. Thus, the present invention can effectively simplify the assembling process of the keyboard.

19 Claims, 22 Drawing Sheets

KEYBOARD STRUCTURE

BACKGROUND OF THE INVENTION

1. Field of the Invention

The present invention relates to a keyboard structure and an assembling method thereof, and more particularly, to a keyboard structure for utilizing a frame to position a keycap and an assembling method thereof.

2. Description of the Prior Art

The keyboard includes a plurality of keycaps widespread applied to input control commands of the computer, for example, the conventional notebook computer has more than eighty keycaps. Generally, the keyboard has the baseplate, the frame and the plurality of keycaps. In the conventional keyboard assembly process, the plurality of keycaps is put on its correct positions on the baseplate for a start, and then the frame is moved downward to assemble with the baseplate for finishing assembly of the keyboard. However, while the frame is assembled with the baseplate, the keycap is easily separated from the correct position on the baseplate by an unexpected external force, and a combination of the frame and the baseplate is interfered by any keycap unexpectedly disassembled from the correct position on the baseplate.

Therefore, design of a keyboard capable of simplifying assembly process and preventing the frame and the baseplate from being interfered by the keycap is an important issue in the related mechanical industry.

SUMMARY OF THE INVENTION

The present invention provides a keyboard structure for utilizing a frame to position a keycap and an assembling method thereof for solving above drawbacks.

According to the claimed invention, a keyboard structure includes a baseplate, an upward force member, a keycap and a frame. The upward force member is disposed on the baseplate. The keycap has a cap body and a skirt, the skirt is extended from edges of the cap body, the skirt has a skirt extending portion and a skirt shaft, and the skirt extending portion and the skirt shaft are extended from the skirt toward a direction away from a center of the cap body. The frame is disposed on the baseplate, and the frame has a frame body, a frame guiding slot and a hook body. The skirt shaft is accommodated inside the frame guiding slot to position the cap body into the frame, and the cap body is movably located between an upper limit position and a lower limit position of the frame. The skirt extending portion engages with the frame body to constrain upward motion of the cap body while the cap body is located on the upper limit position, and the skirt engages with the hook body to constrain downward motion of the cap body to prevent the keycap from being departed from the frame while the keycap is located on the lower limit position. The cap body engages with the upward force member while the baseplate is disposed on the frame, the keycap is able to be pressed and the cap body is movably located between a non-pressed position and a pressed position, the upward force member has a first shape while the cap body is located on the non-pressed position, the upward force member is pressed to transform from the first shape to a second shape while the cap body is located on the pressed position.

According to the claimed invention, a keyboard structure includes a baseplate, an upward force member, a keycap and a frame. The upward force member is disposed on the baseplate. The keycap has a cap body and a skirt, the keycap is able to be pressed, and the cap body is movably located between a non-pressed position and a pressed position. The cap body engages with the upward force member, the skirt is extended from edges of the cap body downwardly, the skirt has a skirt extending portion, and the skirt extending portion is extended from the skirt toward a direction away from a center of the cap body. The frame is disposed on the baseplate, and the frame has a frame body, a frame opening and a hook body. The cap body is exposed via the frame opening, the hook body is extended from the frame body downwardly and has a hook-shaped tail portion, and the hook-shaped tail portion is extended to be located under the skirt. The upward force member has a first shape while the keycap is not pressed, so that the upward force member provides resilient support to the cap body, the skirt extending portion engages with the frame body, and the cap body is kept at the non-pressed position. The upward force member is pressed and deformed to be a second shape having a height lower than ones of the first shape while the keycap is pressed, the cap body is descended to the pressed position, and a first gap is set between the skirt and the hook-shaped tail portion.

According to the claimed invention, the keyboard structure includes a baseplate, an upward force member, a keycap and a frame. The upward force member is disposed on the baseplate. The keycap has a cap body and a skirt, the keycap is able to be pressed and the cap body is movably located between a non-pressed position and a pressed position. The cap body engages with the upward force member, and the skirt is extended from edges of the cap body downwardly. The frame is disposed on the baseplate, and the frame has a frame body, a frame opening and a pair of hook bodies. The cap body is exposed via the frame opening, the pair of hook bodies is respectively located on opposite sides of the cap body, the pair of hook bodies is extended from the frame body downwardly and respectively has a hook-shaped tail portion, and the hook-shaped tail portions of the pair of hook bodies are extended to a projected region under the cap body. The upward force member has a first shape while the keycap is not pressed, so that the upward force member provides resilient support to the keycap, and the cap body is kept at the non-pressed position. The upward force member is pressed and deformed to be a second shape having a height lower than ones of the first shape while the keycap is pressed, the cap body is descended to the pressed position, and a first gap is set between the skirt and at least one of the hook-shaped tail portions of the pair of hook bodies.

According to the claimed invention, the keyboard structure includes a baseplate, an upward force member, a keycap and a frame. The upward force member is disposed on the baseplate. The keycap has a cap body and a skirt, the cap body engages with the upward force member, the skirt has a skirt shaft, the skirt is extended from edges of the cap body downwardly, and the skirt shaft is extended from the skirt toward a direction away from a center of the cap body. The frame is disposed on the baseplate, and the frame has a frame body, a frame guiding slot, a hook body and a frame opening. The skirt shaft is accommodated inside the frame guiding slot, and the skirt shaft is slide inside the frame guiding slot to move the cap body between a non-pressed position and a pressed position. The cap body is exposed via the frame opening, the hook body is extended from the frame body downwardly and has a hook-shaped tail portion, and the hook-shaped tail portion is extended to be located under the skirt. The upward force member has a first shape while the keycap is not pressed, so that the upward force member provides resilient support to the cap body, and the cap body is kept at the non-pressed position. The upward force member is pressed and deformed to be a second shape having a height lower than ones of the first shape while the keycap is pressed, the cap body is descended to the pressed position, and a first gap is set between the skirt and the hook-shaped tail portion.

According to the claimed invention, the assembling method for the keyboard structure includes providing a baseplate, a plurality of keycaps, a frame and a plurality of upward force members. The frame has a frame body, a plurality of passing space and a plurality of hook bodies, each keycap corresponds to at least one of the plurality of upward force members and has a skirt extending portion, the each keycap and each hook body correspond to at least one of the plurality of passing space, the each hook body is extended from the frame body downwardly and has a hook-shaped tail portion. The assembling method further includes moving the each keycap into the corresponding passing space to shift the skirt extending portion of the each keycap under the frame body and further to shift the hook-shaped tail portion of the each hook body under the corresponding passing space. The each keycap is constrained by the upper frame body and the lower hook-shaped tail portion to be movably located between an upper limit position and a lower limit position, and the each keycap is set inside the corresponding passing space. The assembling method further includes combining the frame and the baseplate to engage the each keycap against the corresponding upward force member.

Comparing to the prior art, the keyboard structure and the related assembling method of the present invention utilize the frame body and the hook body of the frame to position the plurality of keycaps, a combination of the frame and the baseplate is not interfered by each keycap during assembly process of the keyboard, which means position adjustment of each keycap is needless through the combination of the frame and the baseplate, and the present invention can simplify and smooth assembly process of the keyboard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
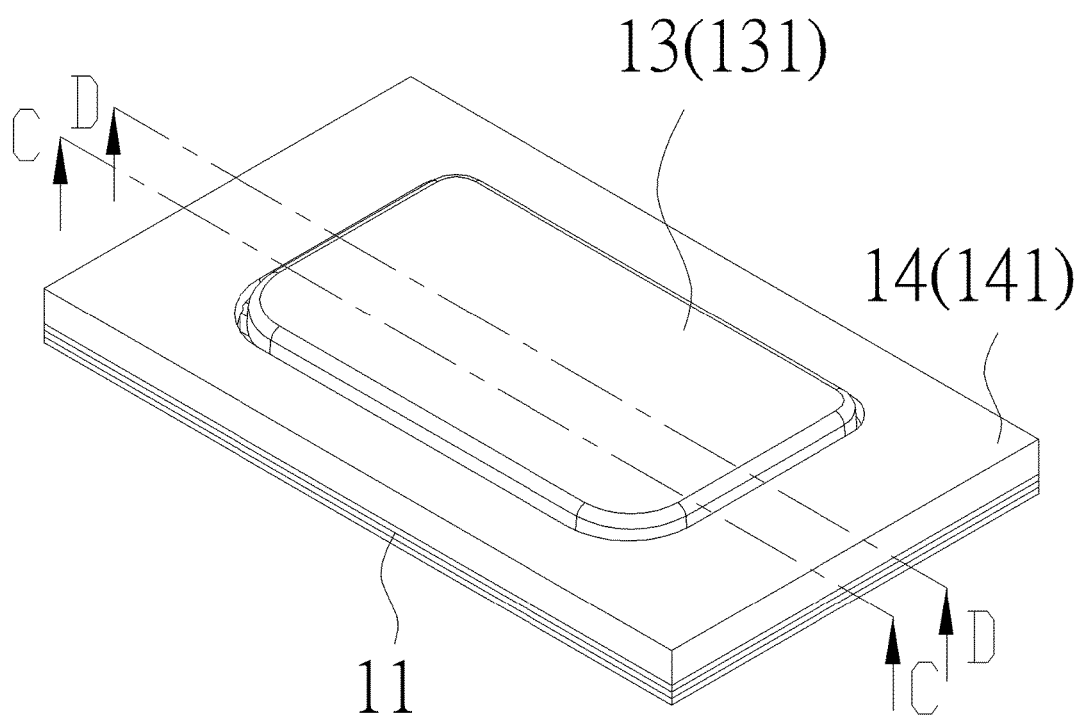
FIG. 1 is a diagram of a keyboard structure having a keycap according to an embodiment of the present invention.

The present invention provides a keyboard structure and a related assembling method. The keyboard structure mainly includes a baseplate, a keycap and a frame. Before assembling the keyboard structure of the present invention, the keycap is positioned inside the frame, and a combination of the frame and the baseplate can be not interfered by the keycap for simplifying assembly process of the keyboard structure.

According to technical improvement of the keyboard structure in the present invention, an embodiment having the single keycap is illustrated with FIGS. 1-13 as following:

Please refer to FIG. 1 to FIG. 4. The keyboard structure 1 includes a baseplate 11, an upward force member 12, a keycap 13 and a frame 14. The upward force member 12 is disposed on the baseplate 11, and the frame 14 can be disposed on the baseplate 11. The frame 14 has a frame opening 144, and the keycap 13 is exposed via the frame opening 144 for pressing operation. In the present invention, the keycap 13 can be pressed and movably located between a non-pressed position and a pressed position. While the keycap 13 is located on the non-pressed position, the upward force member 12 can provide resilient support to the keycap 13. While the keycap 13 is located on the pressed position, the upward force member 12 is pressed and deformed to actuate execution of the baseplate 11.

Figure 2:
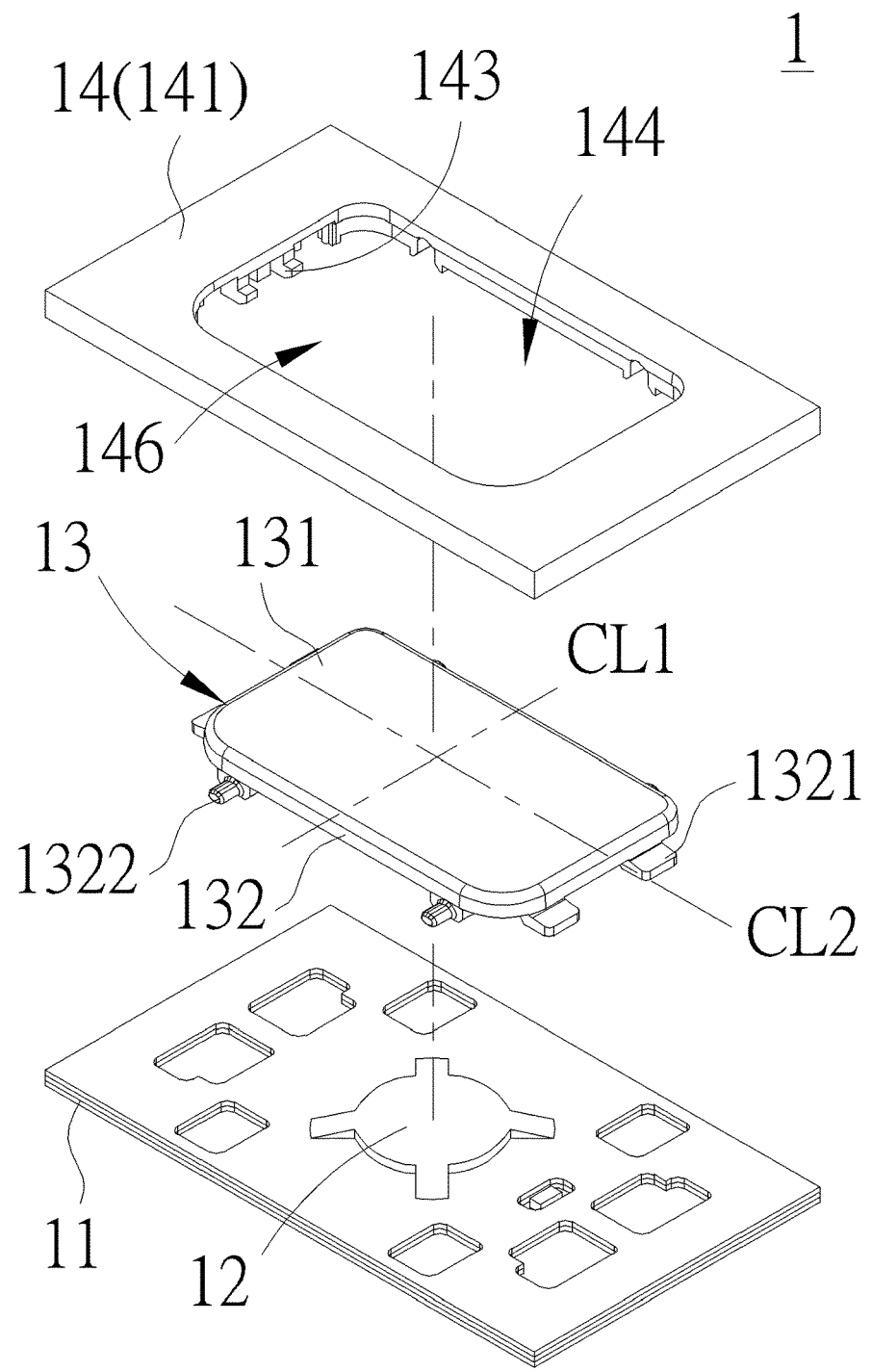
FIG. 2 is an exploded diagram of the keyboard structure in a first visual angle shown in FIG. 1.

In the embodiment, the keycap 13 has a cap body 131, a skirt 132 and a contacting component 133. The skirt 132 is extended from edges of the cap body 131 downwardly, and the skirt 132 has a skirt extending portion 1321 and a skirt shaft 1322 to position the keycap 13 into the frame 14, as shown in FIG. 2, the skirt extending portion 1321 is a plank body extended from the skirt 132 toward a first central direction CL1 away from the cap body 131, and the skirt shaft 1322 is a bar body extended from the skirt 132 toward a second central direction CL2 away from the cap body 131, which means the skirt extending portion 1321 and the skirt shaft 1322 are respectively extended from the skirt 132 toward the direction away from a center of the cap body 131. The first central direction CL1 is substantially perpendicular to the second central direction CL2.

Figure 3:
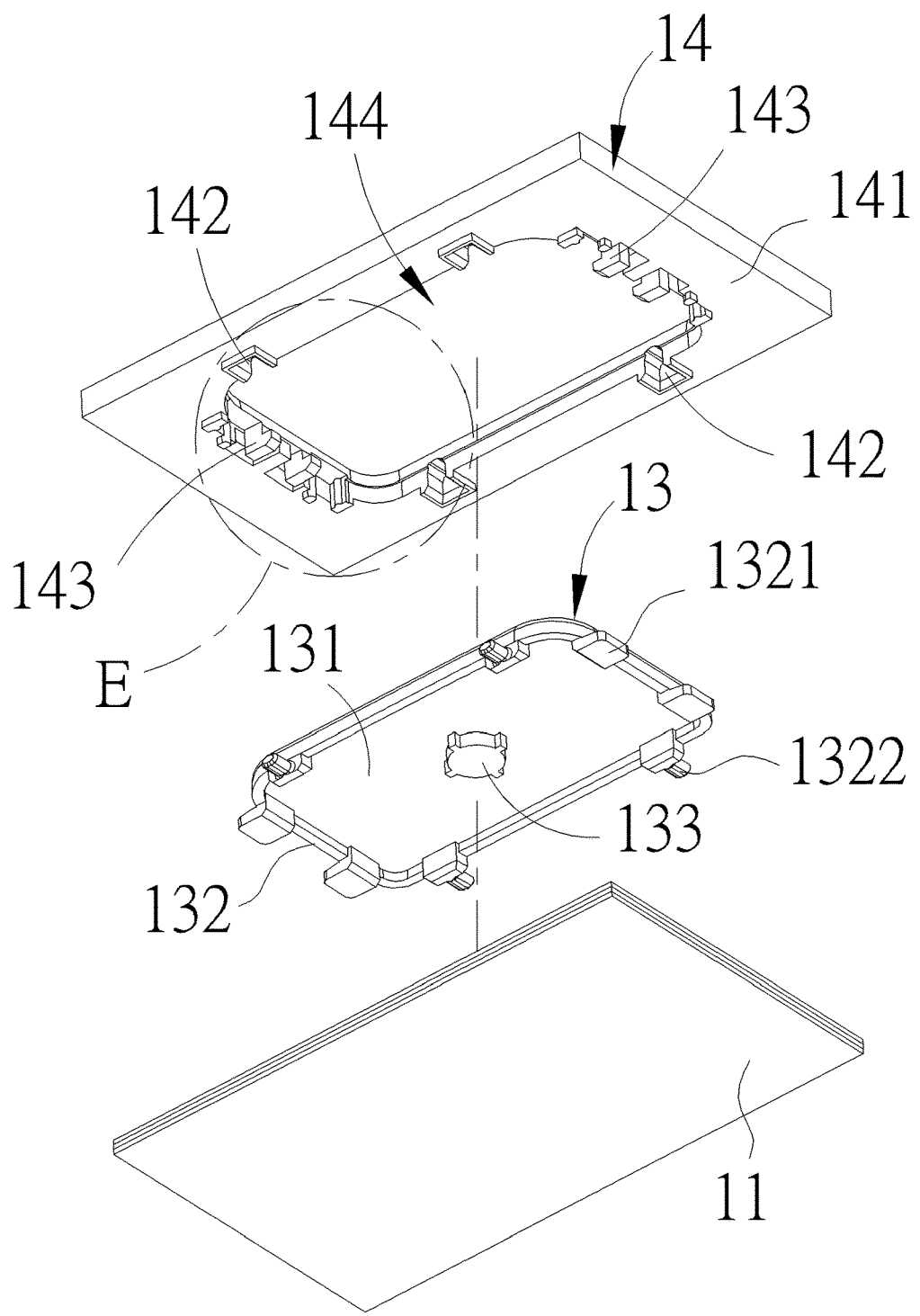
FIG. 3 is an exploded diagram of the keyboard structure in a second visual angle shown in FIG. 1.
Figure 4:
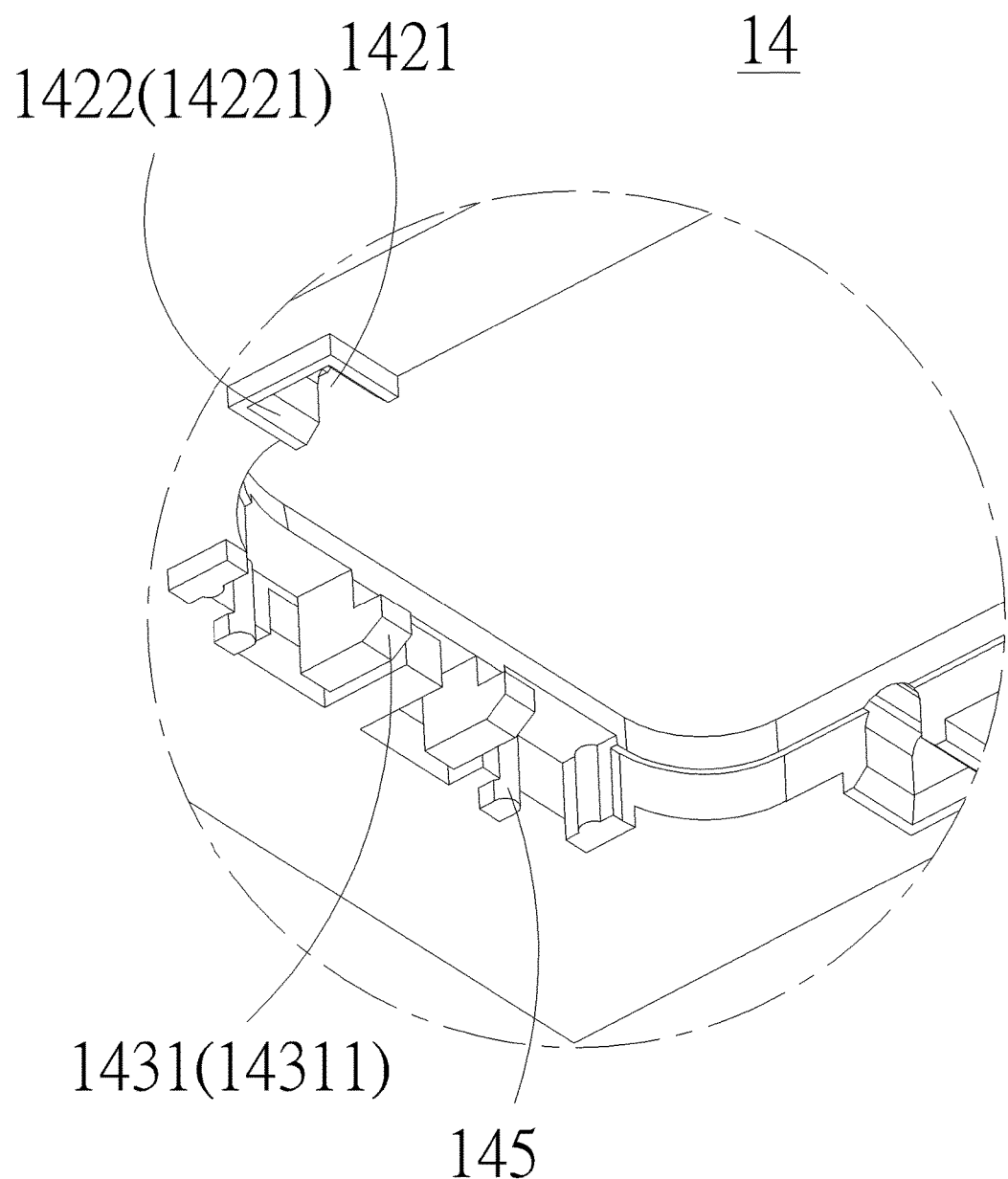
FIG. 4 is an enlarged diagram of a region E of the keyboard structure shown in FIG. 3.
Figure 5:
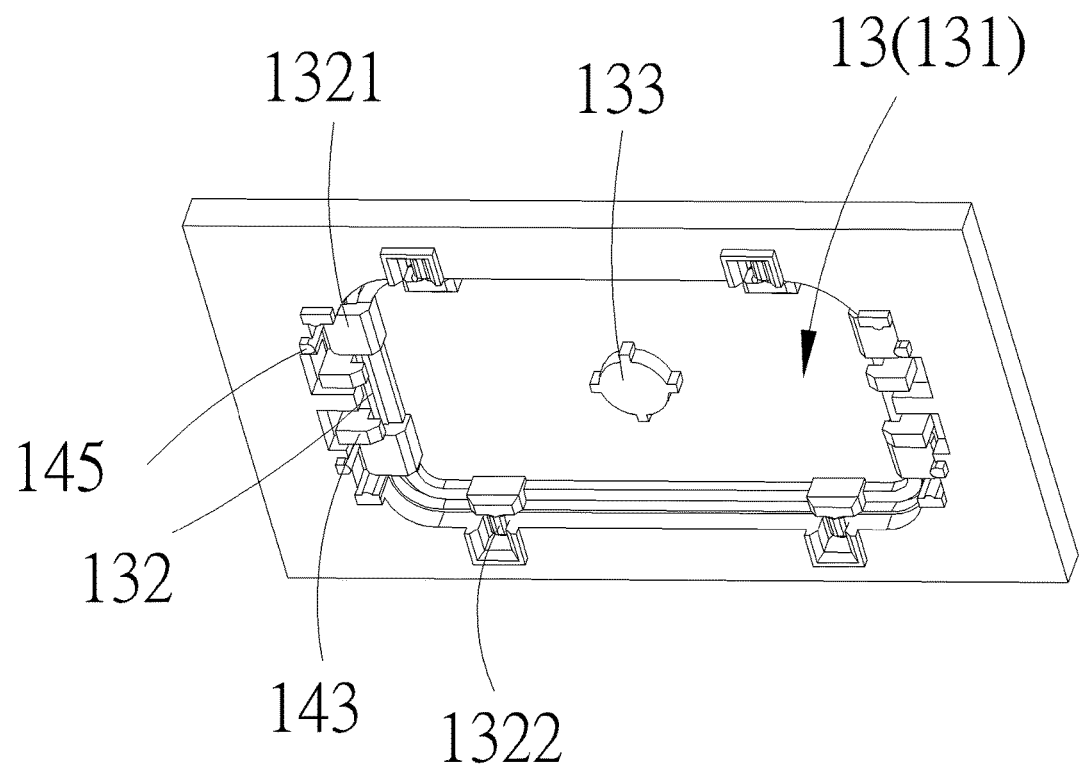
FIG. 5 is a diagram of the keycap disposed on a frame of the keyboard structure shown in FIG. 3.
Figure 6:
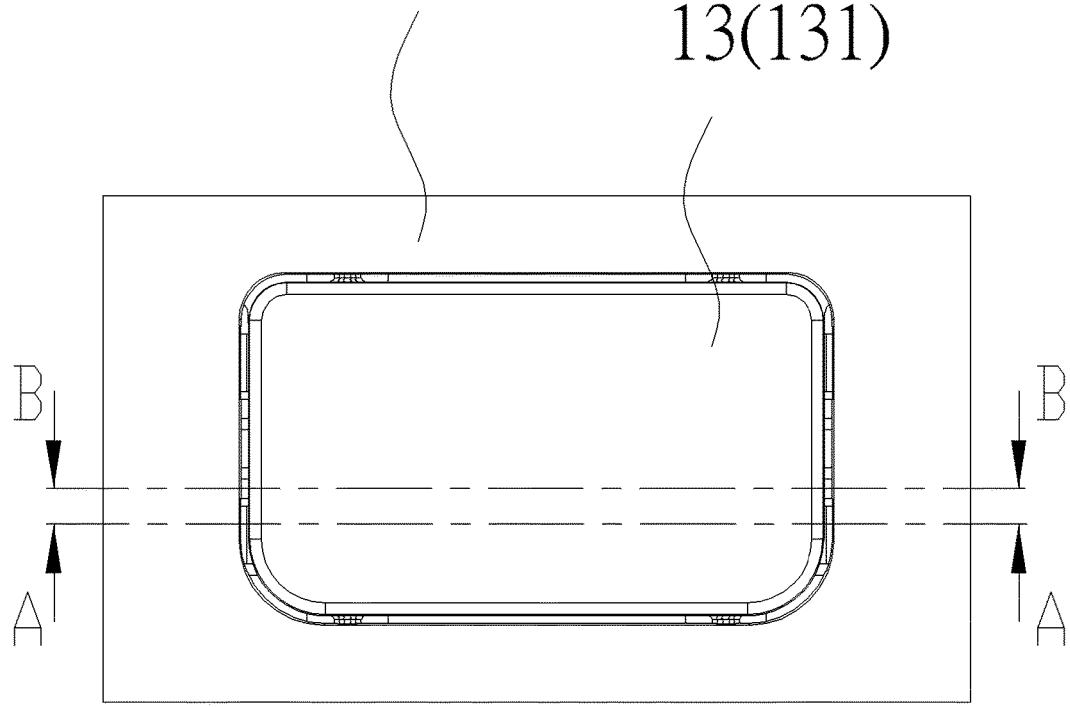
FIG. 6 is a top view of the keyboard structure shown in FIG. 5.

As shown in FIG. 2 to FIG. 4, the frame 14 has a frame body 141, a frame guiding slot 142, a pair of hook bodies 143 and a horizontal constraint portion 145. The frame guiding slot 142 has a guiding slot wall 1422, the guiding slot wall 1422 has a guiding inclined surface 14221 utilized to guide the skirt shaft 1322 into the frame guiding slot 142, as shown in FIG. 5. While the keycap 13 is not pressed, the skirt shaft 1322 may engage against an upper slot wall 1421 of the frame guiding slot 142, or the skirt extending portion 1321 may engage against a lower surface of the frame body 141. Therefore, an upper limit position about motion of the keycap 13 can be defined and used to constrain upward motion of the cap body 131. While the keycap 13 is moved into the corresponding passing space 146, the hook body 143 provides a recovering force to move the hook-shaped tail portion 1431 laterally separated back into a region under the corresponding passing space 146 for constraining downward motion of each keycap 13, and then a lower limit position about the motion of the keycap 13 can be defined accordingly. The horizontal constraint portion 145 is a block body vertically extended from the frame body 141 and protruded toward the skirt extending portion 1321, the block body has an arc lateral surface, and the arc lateral surface is utilized to laterally engage against the skirt extending portion 1321, so that horizontal motion of the keycap 13 can be constrained to limit positioning of the keycap 13 inside the frame 14, and a contacting area between the keycap 13 and the frame 14 can be effectively decreased to reduce friction resistance between the keycap 13 and the frame 14 while the keycap 13 is lifted and lowered.

Figure 8:
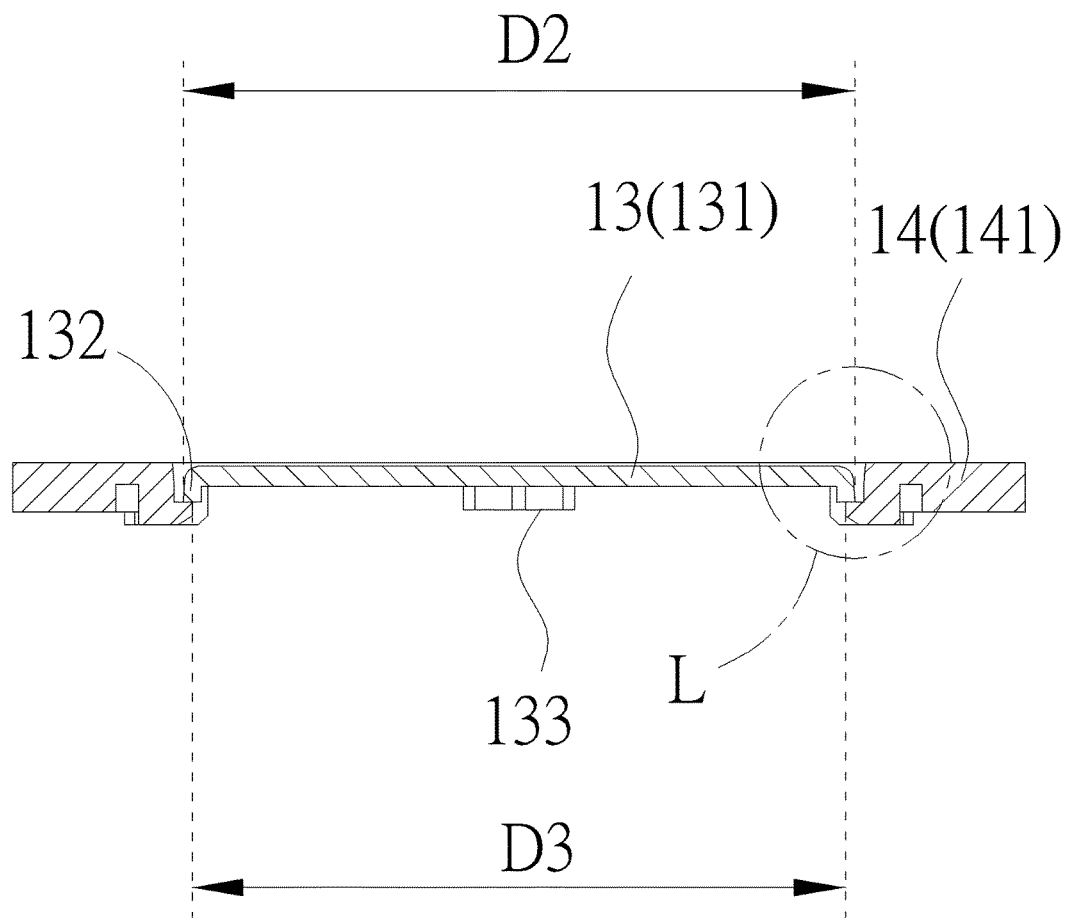
FIG. 8 is a sectional view of a cap body located on the lower limit position inside the frame of the keyboard structure along line B-B shown in FIG. 6.
Figure 9:
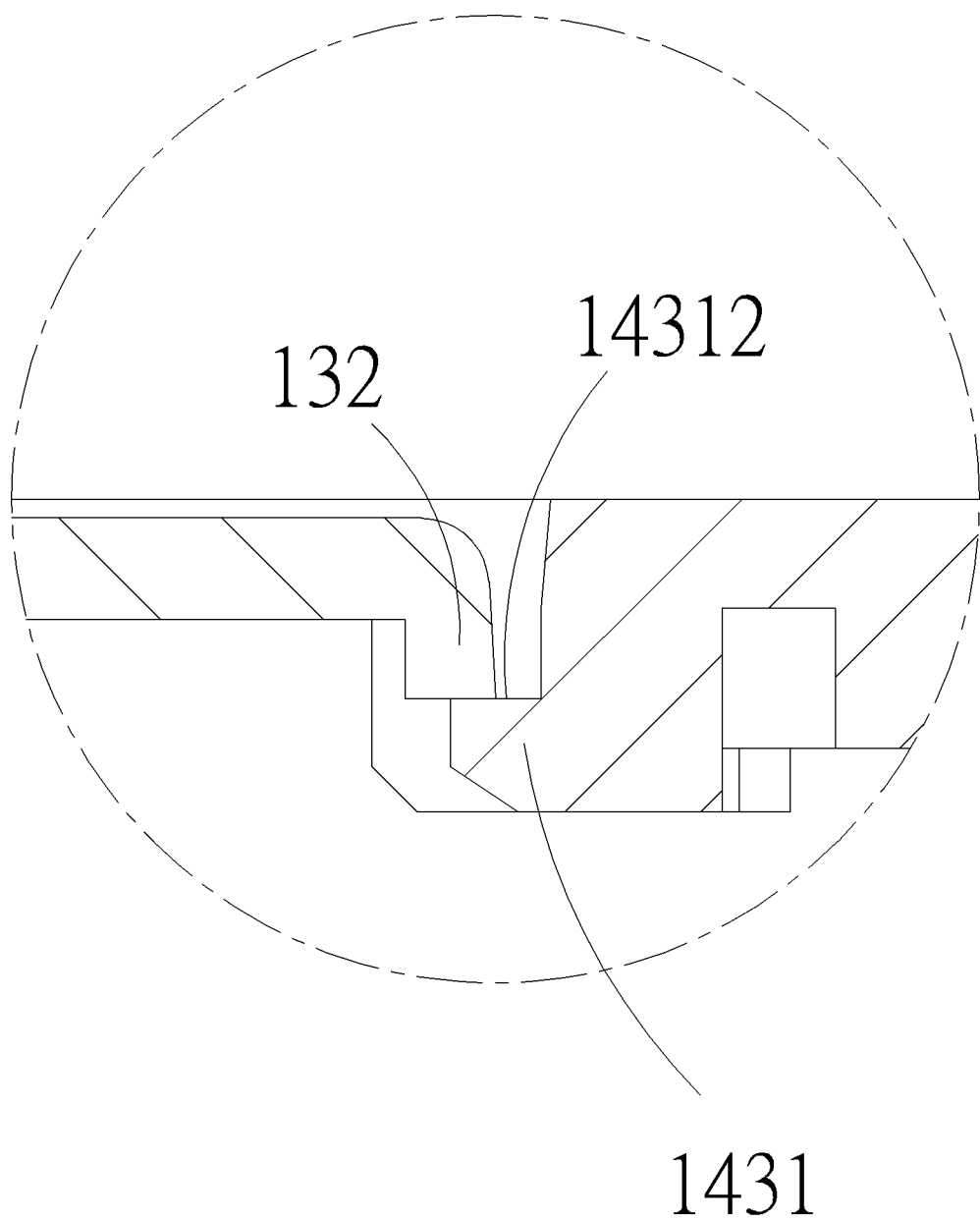
FIG. 9 is an enlarged diagram of a region L of the keyboard structure shown in FIG. 8.

The pair of hook bodies 143 is respectively located on opposite sides of the cap body 131, and is extended from the frame body 141 downwardly and has a hook-shaped tail portion 1431 respectively. As shown in FIG. 8 and FIG. 9, the hook-shaped tail portions 1431 of the pair of hook bodies 143 are extended into a projected region under the cap body 131; that is to say, the hook-shaped tail portions 1431 of the pair of hook bodies 143 are extended from the opposite sides of the cap body 131 toward the center of the cap body 131. A relative measure about the opposite sides of the cap body 131 is defined as a second length D2, a third gap D3 is set between the hook-shaped tail portions 1431 of the pair of hook bodies 143, and the second length D2 is larger than the third gap D3.

Figure 7:
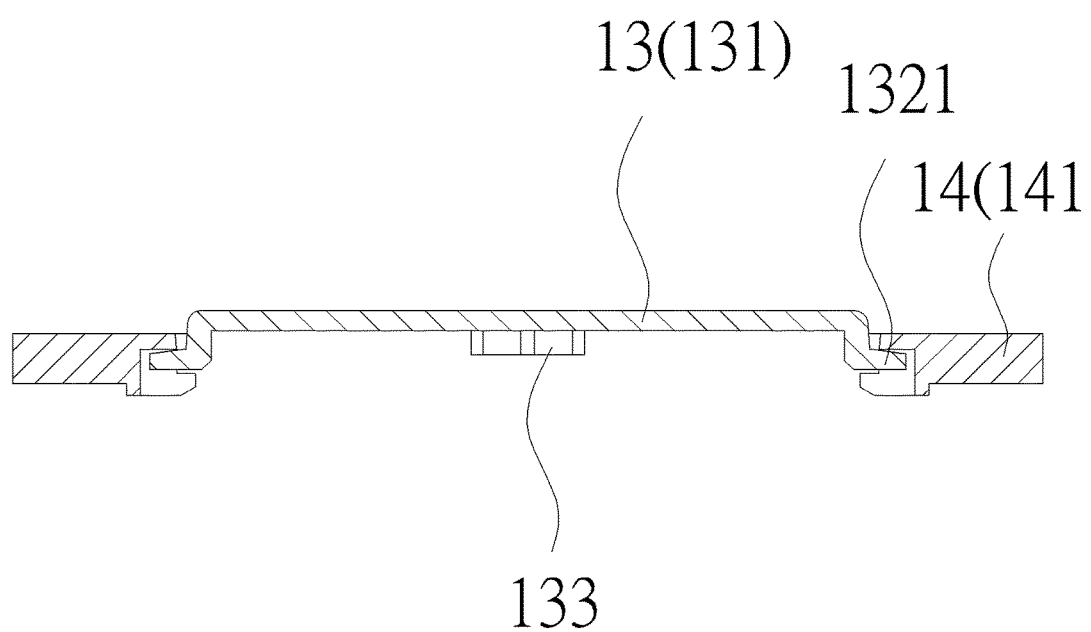
FIG. 7 is a sectional view of a cap body located on the upper limit position inside the frame of the keyboard structure along line A-A shown in FIG. 6.

While the baseplate 11 and the upward force member 12 are not disposed on the frame 14, the skirt shaft 1322 is slidably accommodated inside the frame guiding slot 142 to constrain the upward and downward motion of the cap body 131 inside the frame 14 via the upper limit position and the lower limit position. As shown in FIG. 7, while the cap body 131 is located on the upper limit position, the skirt shaft 1322 may engage against the upper slot wall 1421 of the frame guiding slot 142, or the skirt extending portion 1321 may engage against the frame body 141. The upward motion of the cap body 131 can be constrained accordingly. As shown in FIG. 8 and FIG. 9, while the cap body 131 is located on the lower limit position, the skirt 132 engages with the hook-shaped tail portions 1431 of the pair of hook bodies 143, so that the hook-shaped tail portions 1431 of the pair of hook bodies 143 can constrain the downward motion of the cap body 131 to prevent the keycap 13 from being separated from the frame 14.

Besides, a contacting surface 14312 can be disposed on a side of the hook-shaped tail portion 1431 facing the skirt 132, while the cap body 131 is located on the lower limit position, the skirt 132 engages with the contacting surface 14312 to constrain the downward motion of the cap body 131.

Figure 10:
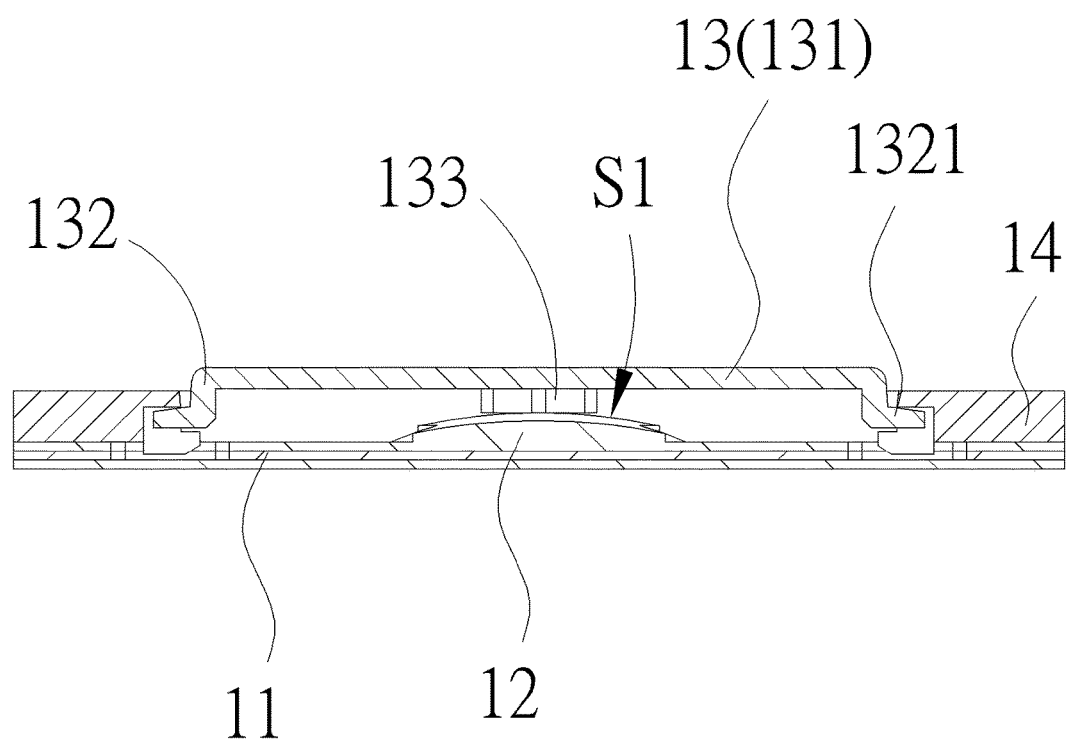
FIG. 10 is a sectional view of the keycap in a non-pressed position of the keyboard structure along line C-C shown in FIG. 1.
Figure 11:
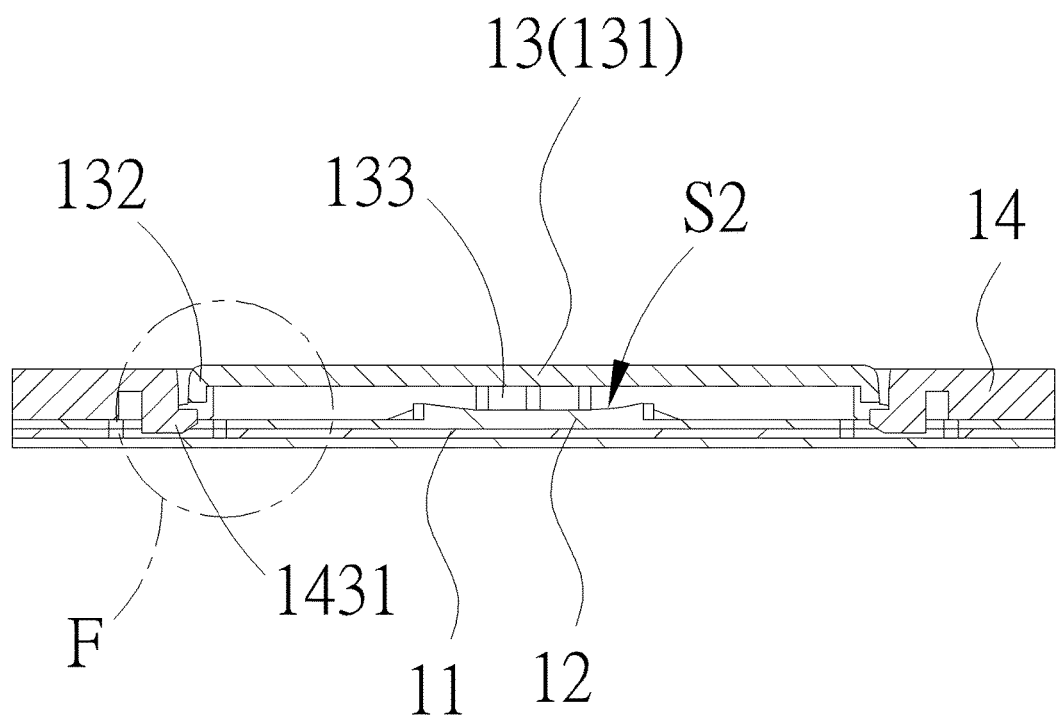
FIG. 11 is a sectional view of the keycap in a pressed position of the keyboard structure along line D-D shown in FIG. 1.
Figure 12:
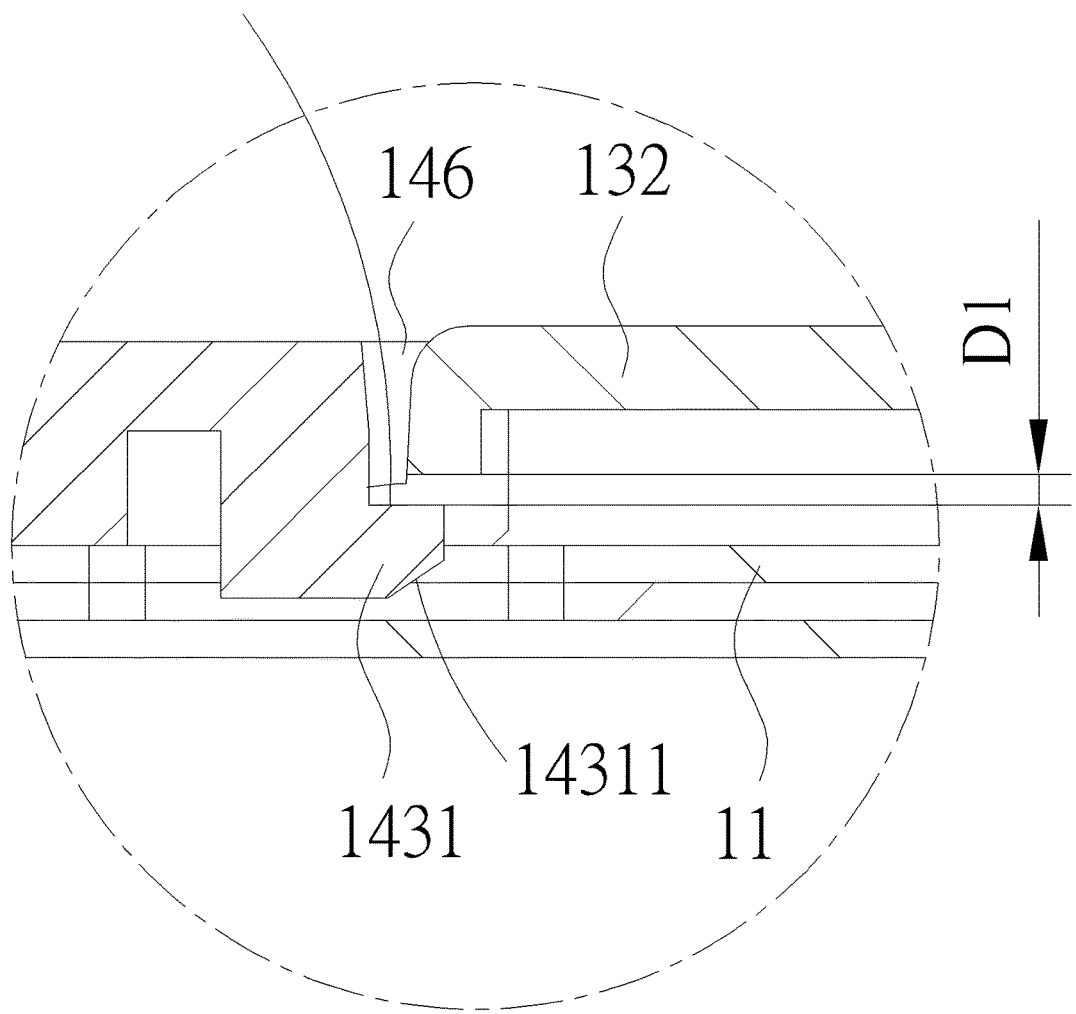
FIG. 12 is an enlarged diagram of a region F of the keyboard structure shown in FIG. 11.

FIG. 10 is a sectional view of the keyboard structure along line C-C shown in FIG. 1 to show the non-pressed keycap. FIG. 11 is a sectional view of the keyboard structure along line D-D shown in FIG. 1 to show the pressed keycap. FIG. 12 is an enlarged diagram of a region F of the keyboard structure shown in FIG. 11. Please refer to FIG. 10 to FIG. 12. While the baseplate 11 is disposed on the frame 14, the contacting component 133 is extended from the center of the cap body 131 downwardly to engage against the upward force member 12. As shown in FIG. 10, while the keycap 13 is located on the non-pressed position, the upward force member 12 has a first shape S1 and provides resilient support to the cap body 131, the skirt extending portion 1321 engages with the frame body 141, and the cap body 131 is kept at the non-pressed position. As shown in FIG. 11, while the keycap 13 is located on the pressed position, the upward force member 12 is pressed by the contacting component 133 and can be transformed from the original first shape S1 into a second shape S2, which means the second shape S2 has height lower than ones of the first shape S1, and the cap body 131 is descended to the pressed position; in the meantime, as shown in FIG. 12, the upward force member 12 has the specific height even through the upward force member 12 is compressed into the second shape S2, descending of the keycap 13 is constrained, and a first gap D1 can be set between the skirt 132 and the hook-shaped tail portion 1431, so as to avoid the skirt 132 and the hook-shaped tail portion 1431 from collision and noise while the keycap 13 is pressed, and further to avoid the skirt 132 and the hook-shaped tail portion 1431 from interference or collision due to unidirectional inclination motion while the keycap 13 is obliquely pressed.

Figure 13:
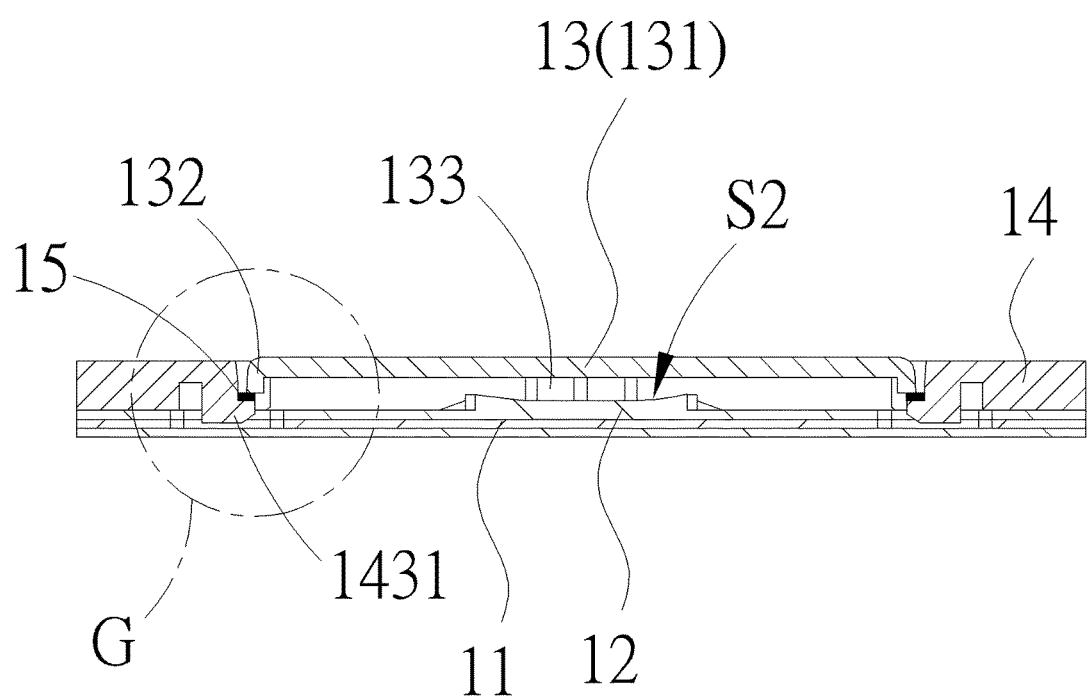
FIG. 13 is a sectional view of the keyboard structure having the resilient buffering component according to the embodiment of the present invention.
Figure 14:
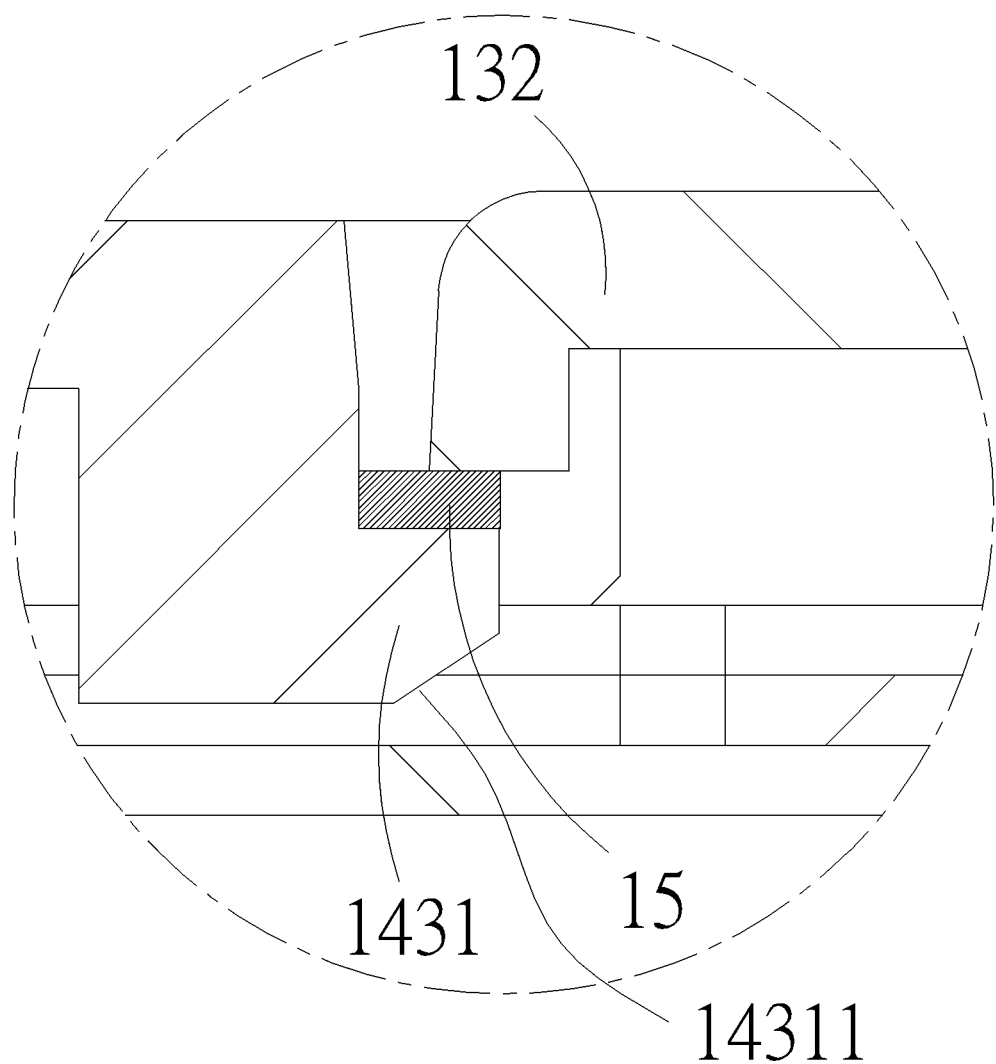
FIG. 14 is an enlarged diagram of a region G of the keyboard structure shown in FIG. 13.
Figure 15:
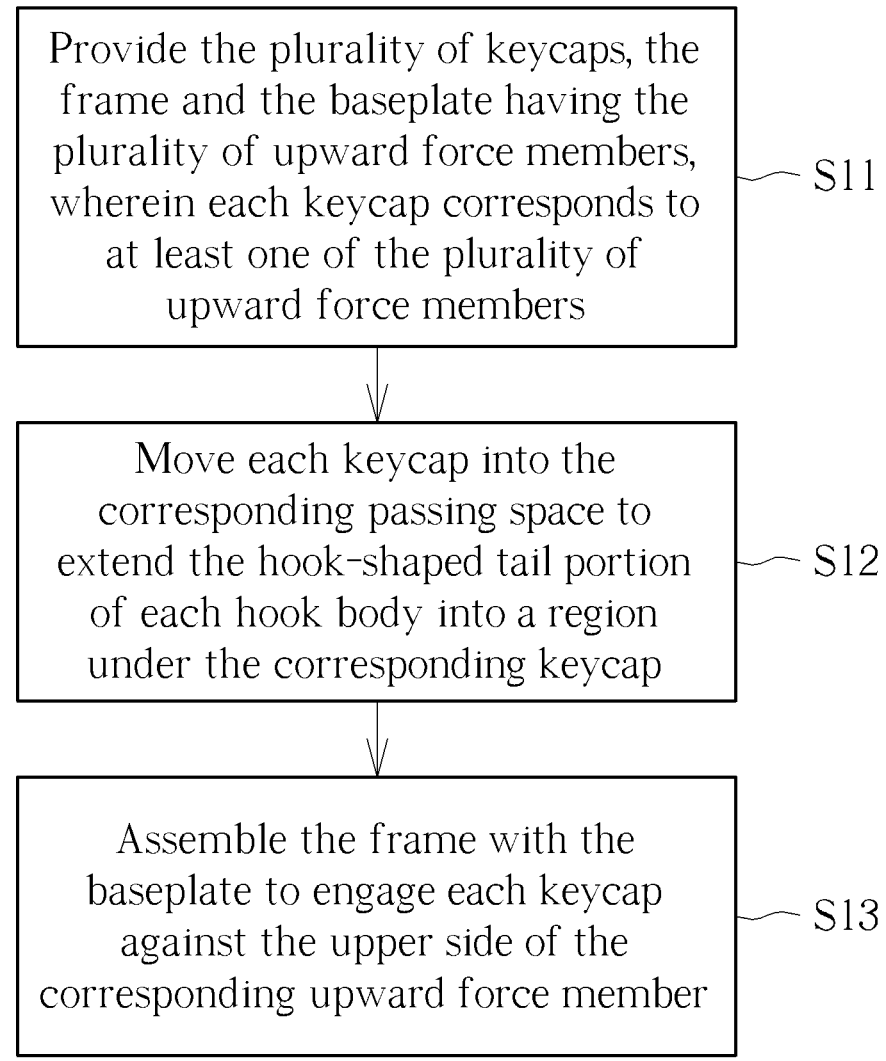
FIG. 15 is a flowchart of an assembling method for the keyboard structure according to the embodiment of the present invention.
Figure 16:
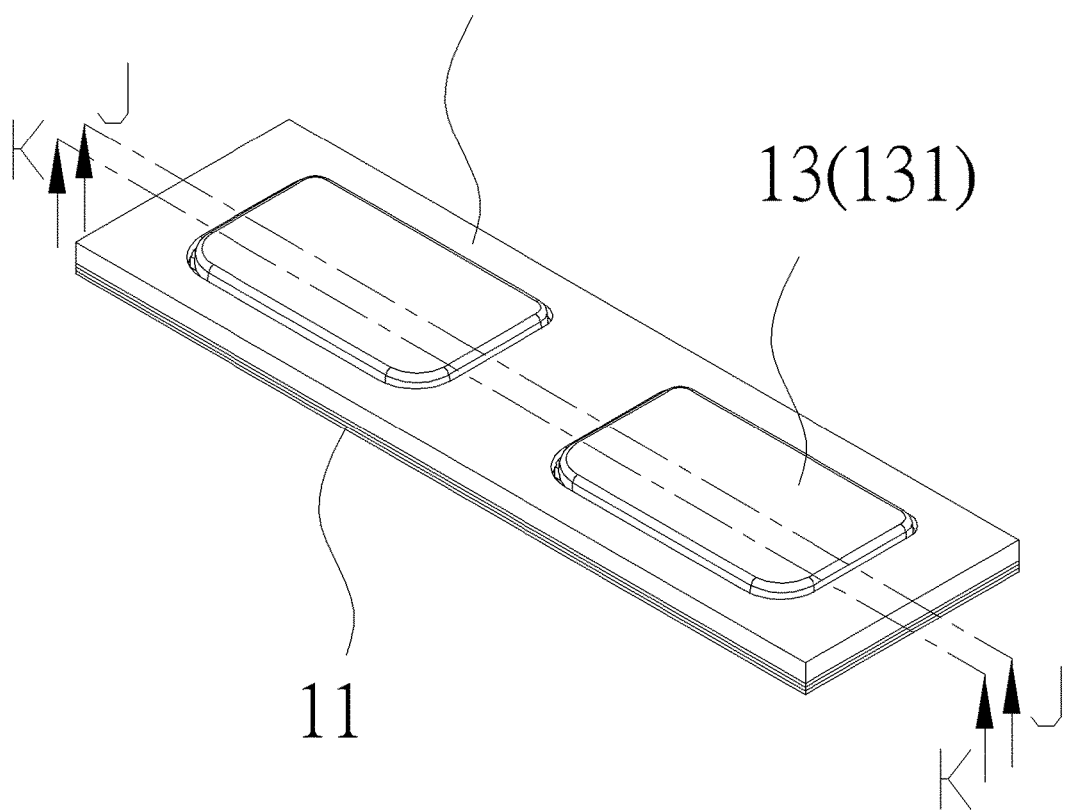
FIG. 16 is a diagram of the keyboard structure having a plurality of keycaps according to the embodiment of the present invention.

As the embodiment shown in FIG. 13 and FIG. 14, the keyboard structure 1 of the present invention can locate a resilient buffering component 15 between the skirt 132 and the hook-shaped tail portion 1431, and the resilient buffering component 15 is preferably disposed on the hook-shaped tail portion 1431; while the skirt 132 is moved toward the hook-shaped tail portion 1431 and is about to arrive the pressed position, the resilient buffering component 15 can engage against the skirt 132 for providing resilient buffer to the skirt 132. Thus, the resilient buffering component 15 not only can prevent the skirt 132 and the hook-shaped tail portion 1431 from collision and noise, but also can constrain a descending distance of the cap body 131 to avoid the upward force member 12 from damage because of excess pressure and deformation.

Figure 17:
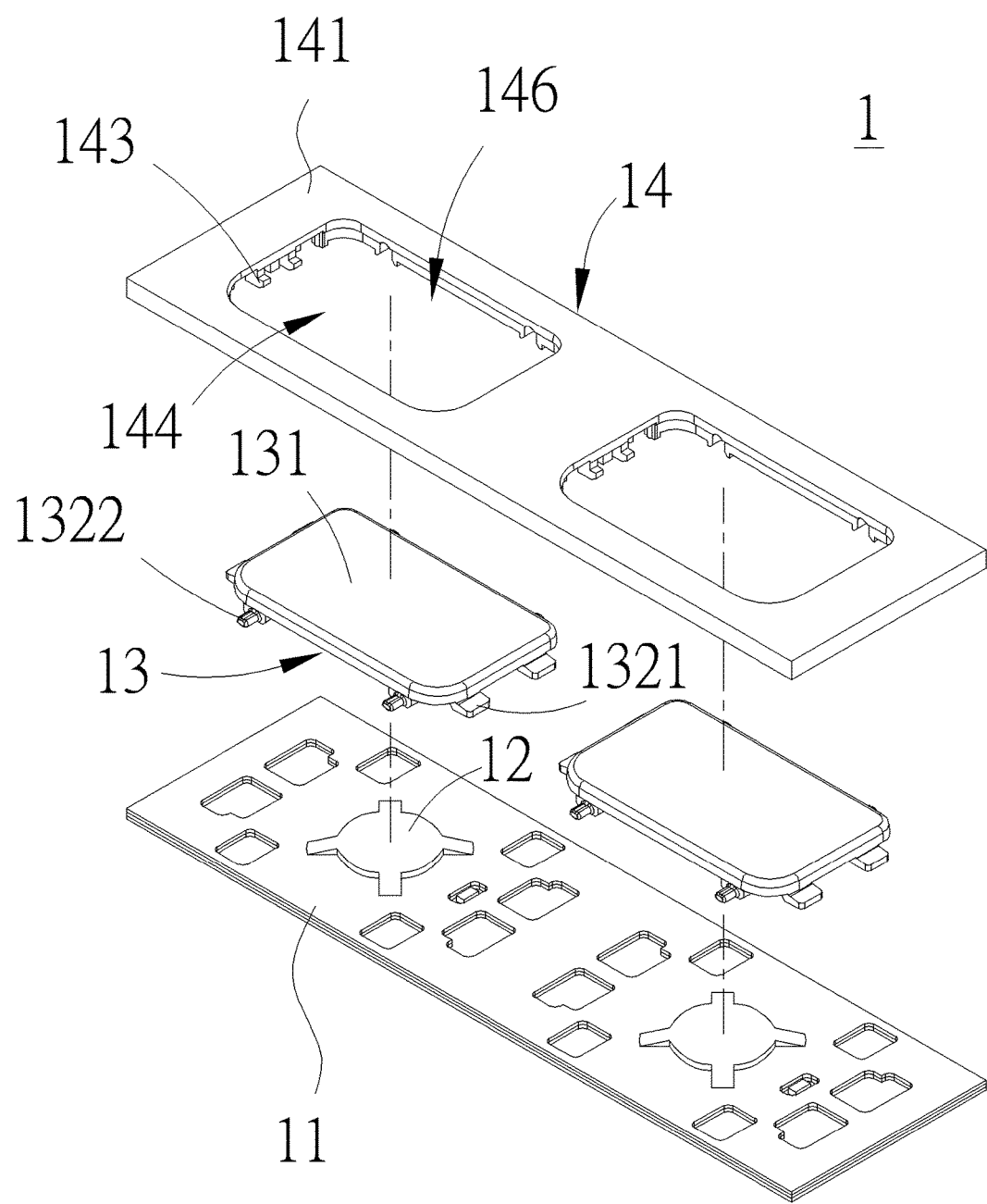
FIG. 17 is an exploded diagram of the keyboard structure shown in FIG. 16.

According to the assembling method of the keyboard structure in the present invention, an embodiment about the plurality of keycaps is illustrated with FIGS. 14-21 as following:

In step S11, the plurality of keycaps 13, the frame 14 and the baseplate 11 whereon the plurality of upward force members 12 is disposed are provided, as shown in FIG. 17. Each keycap 13 can correspond to at least one of the plurality of upward force members 12, and each keycap 13 has the skirt extending portion 1321 and the skirt shaft 1322. In the embodiment, the frame 14 has the frame body 141, the plurality of passing space 146, and the plurality of hook bodies 143. Each hook body 143 is extended from the frame body 141 downwardly and has the hook-shaped tail portion 1431, and each keycap 13 and each hook body 143 can correspond to at least one of the plurality of passing space 146.

Figure 18:
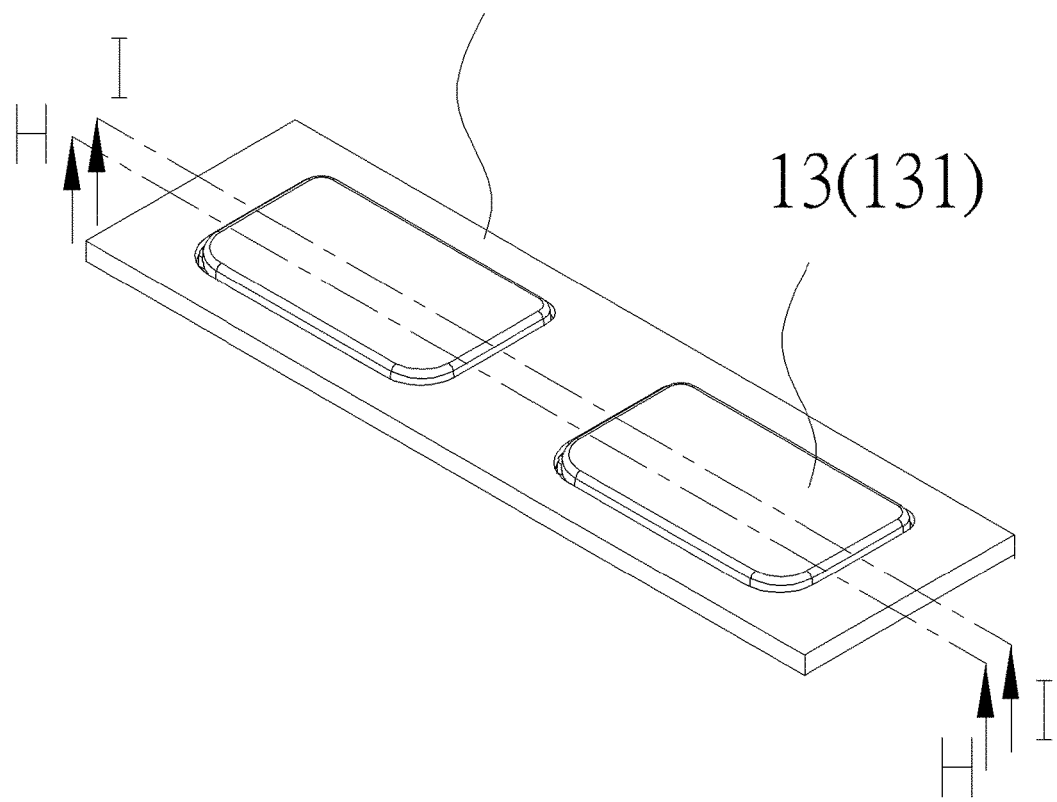
FIG. 18 is a diagram of the keycap disposed on the frame of the keyboard structure shown in FIG. 17.
Figure 19:
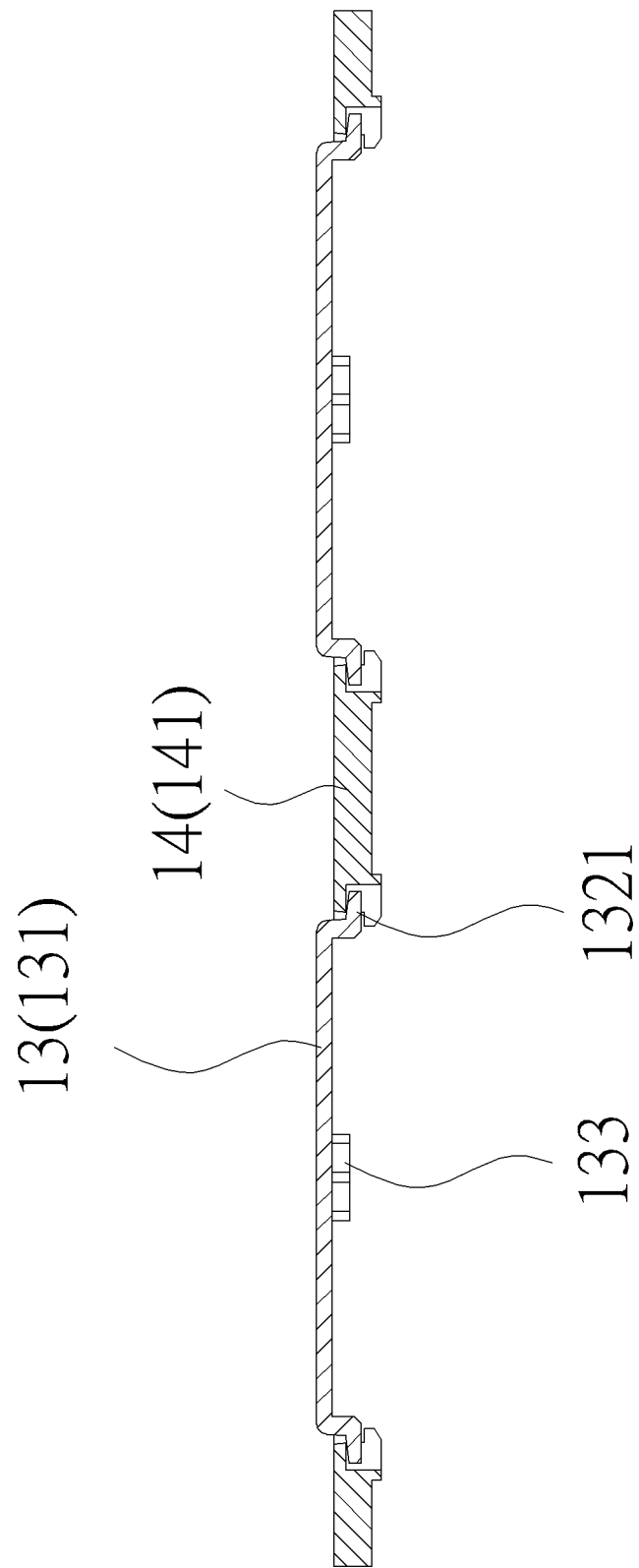
FIG. 19 is a diagram of the cap body located on the upper limit position inside the frame of the keyboard structure along line H-H shown in FIG. 18.
Figure 20:
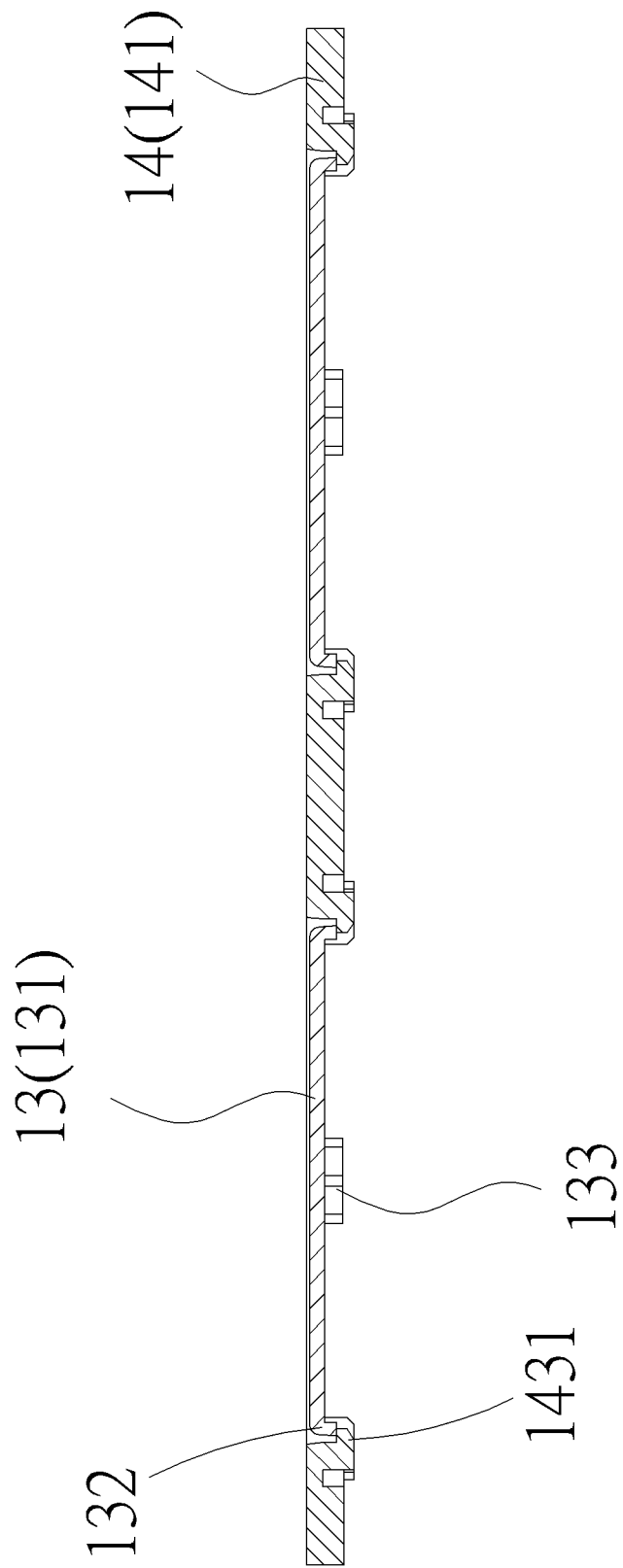
FIG. 20 is a diagram of the cap body located on the lower limit position inside the frame of the keyboard structure along line I-I shown in FIG. 18.

In step S12, as shown in FIG. 18, each keycap 13 is moved into the corresponding passing space 146, which means each cap body 131 can be exposed via the corresponding frame opening 144, the corresponding skirt extending portion 1321 is moved to a region under the frame body 141, and the hook-shaped tail portion 1431 of each hook body 143 is extended to a region under the corresponding keycap 13; therefore, each keycap 13 can be constrained by the upper frame body 141 while being moved to the upper limit position (as shown in FIG. 19), and further can be constrained by the lower hook-shaped tail portion 1431 while being moved to the lower limit position (as shown in FIG. 20). Each keycap 13 is positioned inside the corresponding passing space 146, which means each keycap 13 cannot be departed from the frame 14.

Please refer to FIG. 12. Each keycap 13 is moved into the corresponding passing space 146, the hook-shaped tail portion 1431 of each hook body 143 has an inclined surface 14311, and the inclined surface 14311 is inclined to the passing space 146 above the related hook-shaped tail portion 1431. It should be mentioned that each keycap 13 can engage against the inclined surface 14311 of the related hook-shaped tail portion 1431 while the keycap 13 is moved into the corresponding passing space 146, so as to laterally deform the engaged hook body 143 and to separate the engaged hook-shaped tail portion 1431 laterally from the region under the corresponding passing space 146. Each keycap 13 can enter the corresponding passing space 146, each hook body 143 can provide the recovering force to move the hook-shaped tail portion 1431 laterally separated back into the region under the corresponding passing space 146 while each keycap 13 is moved into the corresponding passing space 146, and the downward motion of each keycap 13 can be constrained to define the lower limit position of the motion of each keycap 13.

Figure 21:
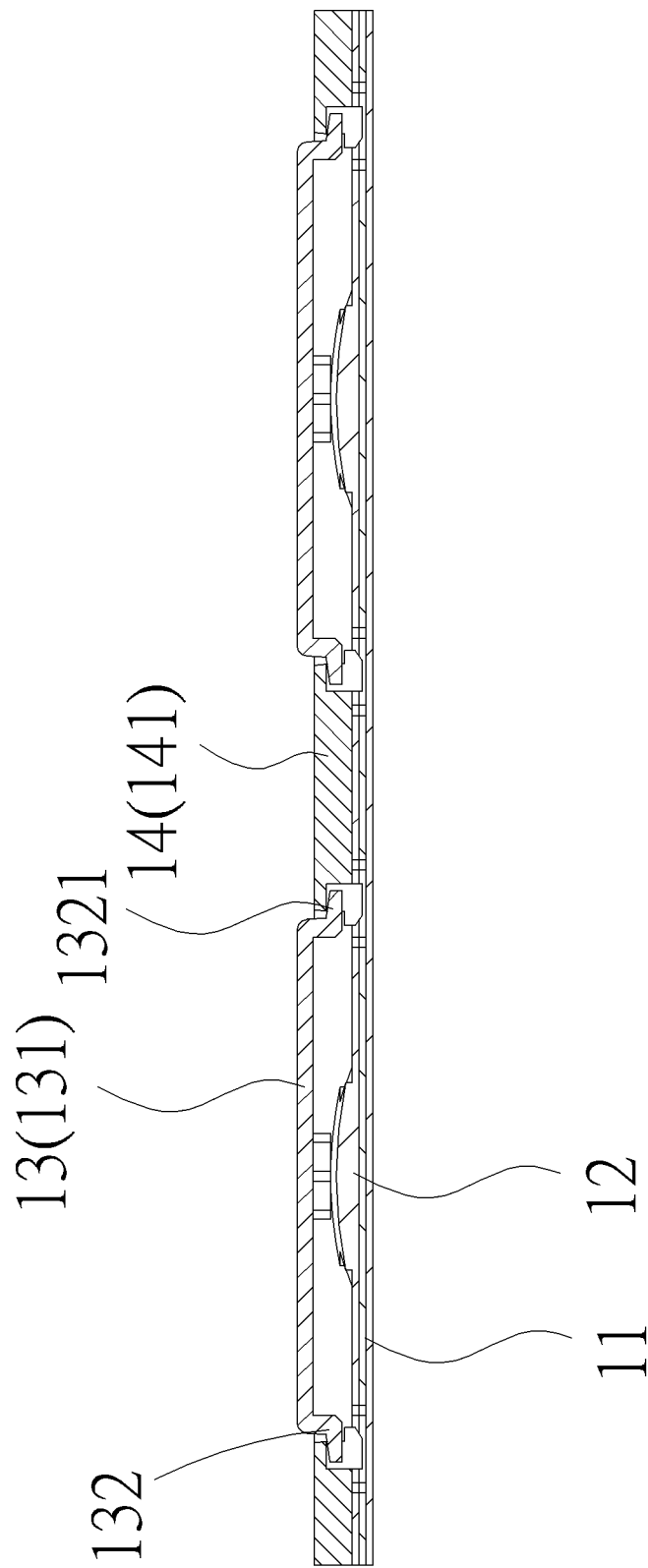
FIG. 21 is a sectional view of the keycap in the non-pressed position of the keyboard structure along line J-J shown in FIG. 16.
Figure 22:
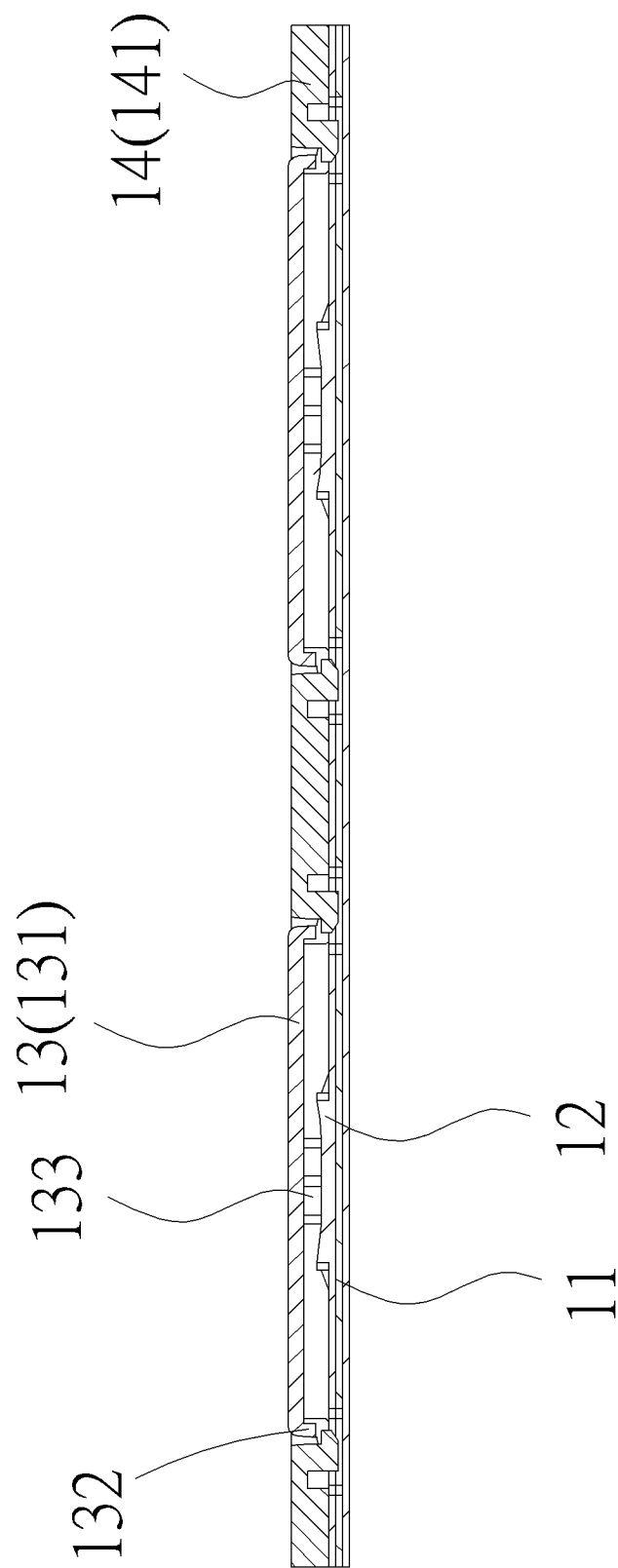
FIG. 22 is a sectional view of the keycap in the pressed position of the keyboard structure along line K-K shown in FIG. 16.

In step S13, the frame 14 and the baseplate 11 are assembled with each other as shown in FIG. 21 and FIG. 22, and each keycap 13 can engage against the upper side of the corresponding upward force member 12. Because each keycap 13 is positioned inside the frame 141 in step S12, a combination of the frame 14 and the baseplate 11 can be not interfered by each keycap 13 during execution of step S13. That is, position adjustment of each keycap 13 is needless through the combination of the frame 14 and the baseplate 11, and the present invention can simplify and smooth the assembly process of the keyboard.

In conclusion, the keyboard structure and the related assembling method of the present invention provide the baseplate, the keycap, and the frame having the hook body. The keycap can enter the frame and be constrained by the hook body, and the keycap can be freely moved between the upper limit position and the lower limit position and cannot be departed from the frame. The subsequent combination of the frame and the baseplate is not interfered by the keycap for simplifying the assembling method of the keyboard in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard structure, comprising:
   a baseplate;
   an upward force member disposed on the baseplate;
   a keycap, having a cap body and a skirt, the skirt extending downward from peripheral edges of the cap body, the skirt having a skirt extending portion and a skirt shaft, the skirt extending portion and the skirt shaft extending from the skirt toward a direction away from a center of the cap body, a skirt bottom surface being located along a first sectional line of the keyboard structure, and the skirt extending portion being located along a second sectional line of the keyboard structure; and
   a frame disposed on the baseplate, the frame having a frame body, a frame guiding slot and a hook body, the skirt shaft being received within the frame guiding slot to limit the cap body movable between an upper limit position and a lower limit position, the hook body being located along the first sectional line, and a frame bottom surface being located along the second sectional line;
   wherein the skirt extending portion is moved upward to contact against the frame bottom surface and is located out of a vertical projected region of the hook body, the skirt is located out of a vertical projected region of the frame body, and the skirt bottom surface is located inside the vertical projected region of the hook body;
   wherein when the cap body is located on the upper limit position, the skirt extending portion engages with the frame body to prevent further upward motion of the cap body;
   wherein before the baseplate is combined with the frame and when the keycap is located on the lower limit position, the skirt engages with the hook body to prevent further downward motion of the cap body to prevent the keycap from being departed from the frame;
   wherein when the baseplate is combined with the frame, the cap body engages with the upward force member, the cap body is movably located between a non-pressed position and a pressed position, the upward force member has a first shape while the cap body is located on the non-pressed position, the upward force member is pressed to transform from the first shape to a second shape while the cap body is located on the pressed position.

2. The keyboard structure of claim 1, wherein the hook body is extended from the frame body downwardly and has a hook-shaped tail portion, the hook-shaped tail portion is extended to be located under the skirt.

3. The keyboard structure of claim 2, wherein a contacting surface is disposed on a side of the hook-shaped tail portion facing the skirt, and the skirt engages with the contacting surface to constrain the downward motion of the cap body while the cap body is located on the lower limit position.

4. A keyboard structure, comprising:
a baseplate;
an upward force member disposed on the baseplate;
a keycap, having a cap body and a skirt, the cap body being movably located between a non-pressed position and a pressed position, the cap body supported by the upward force member, the skirt extending downward from peripheral edges of the cap body, the skirt having a skirt extending portion, and the skirt extending portion extending from the skirt toward a direction away from a center of the cap body, a skirt bottom surface being located along a first sectional line of the keyboard structure, and the skirt extending portion being located along a second sectional line of the keyboard structure; and
a frame disposed on the baseplate, the frame having a frame body, a frame opening and a hook body, the cap body being exposed via the frame opening, the hook body extending from the frame body downwardly and having a hook-shaped tail portion, and part of the hook-shaped tail portion extending beneath the skirt, the hook body being located along the first sectional line, and a frame bottom surface being located along the second sectional line;
wherein the skirt extending portion is moved upward to contact against the frame bottom surface and is located out of a vertical projected region of the hook body, the skirt is located out of a vertical projected region of the frame body, and the skirt bottom surface is located inside the vertical projected region of the hook body;
wherein when the keycap is not pressed, the upward force member pushes the cap body upward, the skirt extending portion engages with the frame body, and the cap body is kept at the non-pressed position; and
wherein when the keycap is pressed, the cap body is descended to the pressed position, and a first gap is set between the skirt and the hook-shaped tail portion.

5. The keyboard structure of claim 4, wherein a frame guiding slot on the frame has a guiding slot wall, the guiding slot wall has a guiding inclined surface, and the guiding inclined surface is utilized to guide a skirt shaft of the skirt into the frame guiding slot.

6. The keyboard structure of claim 4, wherein the frame further has a horizontal constraint portion, and the horizontal constraint portion is utilized to engage against the skirt to constrain horizontal motion of the cap body.

7. The keyboard structure of claim 6, wherein the horizontal constraint portion is a block body vertically extended from the frame body and protruded toward the skirt extending portion, and the block body has an arc lateral surface.

8. The keyboard structure of claim 4, further comprising:
a resilient buffering component respectively engaging against the skirt and the hook-shaped tail portion to provide resilient buffer for motion of the skirt while the skirt is moved toward the hook-shaped tail portion.

9. The keyboard structure of claim 4, wherein the keycap further has a contacting component, the contacting component is extended from a center of the cap body downwardly to engage against an upper side of the upward force member, and the keycap presses the upward force member via the contacting component.

10. A keyboard structure, comprising:
a baseplate;
an upward force member disposed on the baseplate;
a keycap, having a cap body and a skirt, the cap body being movably located between a non-pressed position and a pressed position, the cap body engaging with the upward force member, and the skirt extending from peripheral edges of the cap body downwardly, a skirt bottom surface being located along a first sectional line of the keyboard structure, and a skirt extending portion being located along a second sectional line of the keyboard structure; and
a frame disposed on the baseplate, the frame having a frame body, a frame opening and a pair of hook bodies, the cap body being exposed via the frame opening, the pair of hook bodies being respectively located on opposite sides of the cap body, the pair of hook bodies extending from the frame body downwardly and respectively having a hook-shaped tail portion, and part of the hook-shaped tail portions extending beneath the cap body, one hook body being located along the first sectional line, and a frame bottom surface being located along the second sectional line;
wherein the skirt extending portion is moved upward to contact against the frame bottom surface and is located out of a vertical projected region of the hook body, the skirt is located out of a vertical projected region of the frame body, and the skirt bottom surface is located inside the vertical projected region of the hook body;
wherein when the keycap is not pressed, the upward force member pushes the keycap upward, and the cap body is kept at the non-pressed position; and
wherein when the keycap is pressed, the cap body is descended to the pressed position, and a first gap is set between the skirt and at least one of the hook-shaped tail portions of the pair of hook bodies.

11. The keyboard structure of claim 10, wherein the hook-shaped tail portions of the pair of hook bodies are respectively extended toward opposite sides of the cap body, an interval between the opposite sides of the cap body is defined as a second length, a third gap is set between the hook-shaped tail portions of the pair of hook bodies, and the second length is larger than the third gap.

12. The keyboard structure of claim 10, wherein a frame guiding slot on the frame has a guiding slot wall, the guiding slot wall has a guiding inclined surface, and the guiding inclined surface is utilized to guide a skirt shaft of the skirt into the frame guiding slot.

13. The keyboard structure of claim 10, wherein the frame further has a horizontal constraint portion, and the horizontal constraint portion is utilized to engage against the skirt to constrain horizontal motion of the cap body.

14. The keyboard structure of claim 13, wherein the horizontal constraint portion is a block body vertically extended from the frame body and protruded toward a skirt extending portion of the skirt, and the block body has an arc lateral surface.

15. A keyboard structure, comprising:
a baseplate;
an upward force member disposed on the baseplate;
a keycap, having a cap body and a skirt, the cap body engaging with the upward force member, the skirt having a skirt shaft, the skirt extending from peripheral edges of the cap body downwardly, and the skirt shaft extending from the skirt toward a direction away from a center of the cap body, a skirt bottom surface being located along a first sectional line of the keyboard structure, and a skirt extending portion being located along a second sectional line of the keyboard structure; and a frame disposed on the baseplate, the frame having a frame body, a frame guiding slot, a hook body and a frame opening, the skirt shaft being slidably received with the frame guiding slot, and the cap body capable to move between a non-pressed position and a pressed position, the cap body being exposed via the frame opening, the hook body extending from the frame body downwardly and having a hook-shaped tail portion, and part of the hook-shaped tail portion extending beneath the skirt, the hook body being located along the first sectional line, and a frame bottom surface being located along the second sectional line;

wherein the skirt extending portion is moved upward to contact against the frame bottom surface and is located out of a vertical projected region of the hook body, the skirt is located out of a vertical projected region of the frame body, and the skirt bottom surface is located inside the vertical projected region of the hook body;

wherein when the keycap is not pressed, the upward force member pushes the cap body upward, and the cap body is kept at the non-pressed position; and wherein when the keycap is pressed, the cap body is descended to the pressed position, and a first gap is set between the skirt and the hook-shaped tail portion.

16. The keyboard structure of claim 15, wherein the skirt shaft engages with an upper slot wall of the frame guiding slot while the keycap is not pressed.

17. The keyboard structure of claim 15, wherein the frame guiding slot has a guiding slot wall, the guiding slot wall has a guiding inclined surface, and the guiding inclined surface is utilized to guide the skirt shaft into the frame guiding slot.

18. The keyboard structure of claim 15, wherein the frame further has a horizontal constraint portion, and the horizontal constraint portion is utilized to engage against the skirt to constrain horizontal motion of the cap body.

19. The keyboard structure of claim 18, wherein the horizontal constraint portion is a block body vertically extended from the frame body and protruded toward the skirt extending portion, and the block body has an arc lateral surface.

* * * * *